June 4, 1929.  H. PERROT  1,716,148

BRAKE OPERATING MECHANISM

Original Filed July 24, 1922

INVENTOR
HENRI PERROT
BY
M. W. McConkey
ATTORNEY

Patented June 4, 1929.

1,716,148

UNITED STATES PATENT OFFICE.

HENRI PERROT, OF PARIS, FRANCE, ASSIGNOR TO BENDIX CORPORATION, OF CHICAGO, ILLINOIS, A CORPORATION OF ILLINOIS.

BRAKE-OPERATING MECHANISM.

Original application filed July 24, 1922, Serial No. 577,201, and in France September 7, 1921. Divided and this application filed May 2, 1925. Serial No. 27,475.

This invention relates to brakes, and is illustrated as embodied in an automobile chassis having brakes on all four wheels. An object of the invention is to vary the pressure on the brakes automatically, in rounding a corner, to guard against locking the wheels at that time.

Having this object in mind, one feature of the invention relates to releasing (or increasing if desired) the pressure on both of a pair of brakes, by means automatically operated by swivelling the front wheels. Preferably this is done by so arranging the brake-operating mechanism, with respect to the axes about which the wheels swivel, that the desired variation takes place without the use of additional parts. In the arrangement illustrated, two arms are connected by a link allowing the swivelling of the wheel, but swung in a direction to release (or increase) the pressure, the joint at one end of the link being horizontally spaced from the steering axis in a plane substantially parallel to the wheel.

Other features of the invention relate to various novel combinations of parts and desirable particular constructions which will be apparent from the following description of one illustrative embodiment shown in the accompanying drawings, in which.

Figure 1:
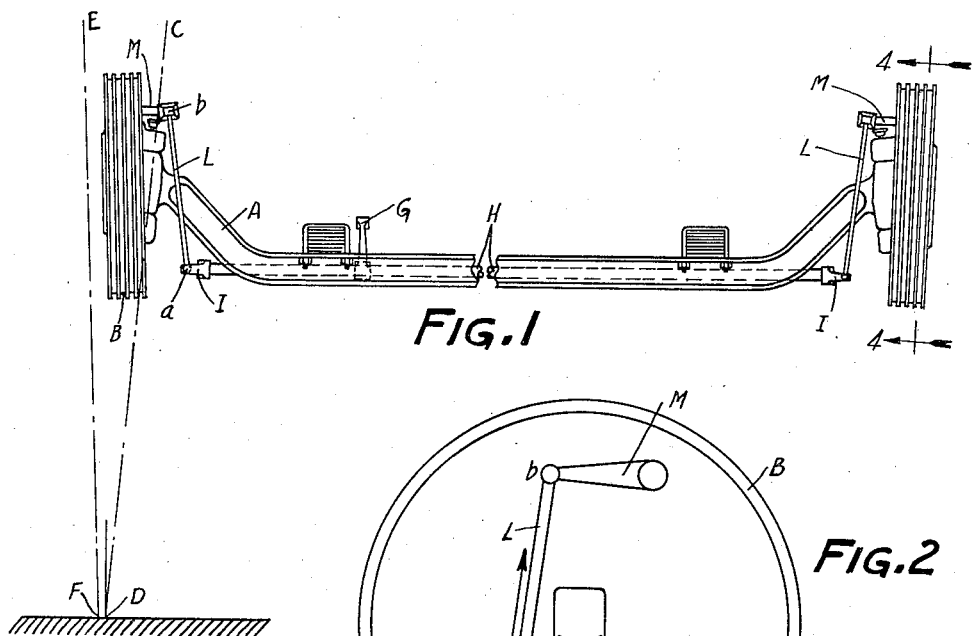
Fig. 1 is a diagrammatic front elevation of the brakes arranged to act on a pair of swivelled steering wheels.
Figure 2:
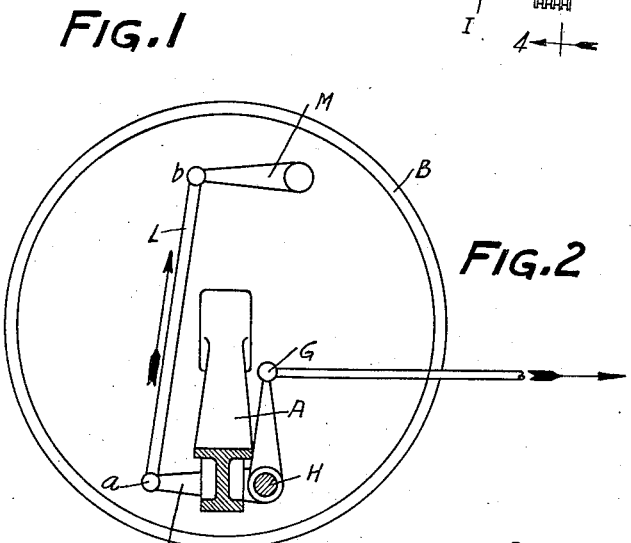
Fig. 2 is a vertical section through the front axle, looking outward at the brake in side elevation.

In Figs. 1 and 2, A represents the body of the axle, B the brake drum, C D the pivot axis of the wheel and E F the wheel axis. The brake is controlled by the lever G which is connected with the brake pedal or hand lever. The lever G actuates shaft H having mounted thereon at each end a lever I which drives by means of rod L the arm M which is connected with the brake expander cam X. The point $b$ at the upper end of rod L describes a circle about the pivot axis C, D of the wheel when the wheels are steered; said point $b$ may be disposed by construction in various positions with respect to the plane P.

Figure 3:
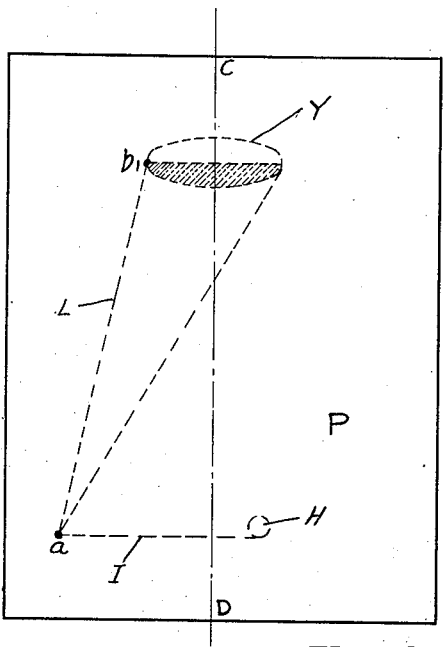
Fig. 3 is a diagram showing the variation in braking due to swivelling the wheel.
Figure 4:
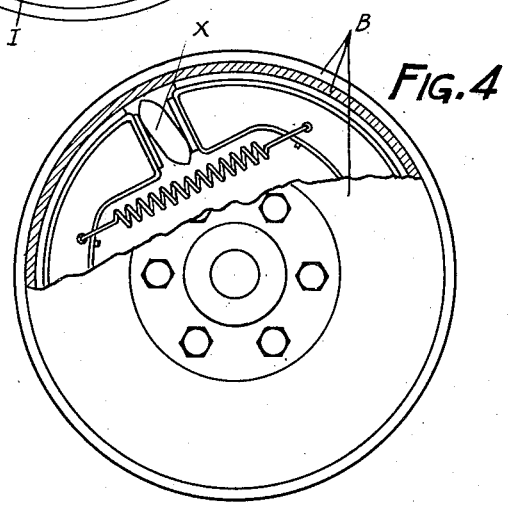
Fig. 4 is a vertical section on the line 4—4 of Fig. 1, with the upper part of the brake drum broken away to show the brake.

In the arrangement illustrated, and as shown in the diagram of Figure 3, the joint $b$ between lever I and rod L is swung, in applying the brake, upwardly from the position shown in Fig. 1 to the position $b^1$ in Fig. 3, the position $b^1$ being a short distance (a few hundredths of an inch in practice) toward the front of the car from the pivot axis CD, and in a plane P defined by the axis CD and the joint $a$ at the lower end of rod L.

Swivelling the wheel about axis CD when the brake is applied, in either direction, tends to swing joint $b$ from the position $b^1$ about the circumference of a circle Y having its center in axis CD and arranged in a plane perpendicular to that axis. It will be seen that every point other than $b^1$ in the circle Y is further from $a$ than is $b^1$, and, since rod L is under compression in applying the brake, this movement of joint $b$ around circle Y tends to move lever M away from lever I and thus relieves the pressure on the brake, whichever direction the wheel is swivelled.

Preferably the front brakes are not equalized against the rear brakes, and therefor the relief in pressure on both the front brakes, which takes place when the wheels are swivelled in either direction, will not affect the rear brakes.

The subject-matter of this application is disclosed in my prior application No. 577,201, filed July 24, 1922.

While one illustrative embodiment of the invention has been described in detail, it is not my intention to limit its scope to that particular embodiment, or otherwise than by the terms of the appended claims.

I claim:

1. The combination with a pair of steering wheels of a vehicle, of devices for braking the respective wheels equally when the wheels are moving straight ahead, said devices being disposed so that the action thereof in turning is such as to automatically produce less braking on both front wheels.

2. The combination with a pair of steering wheels of a vehicle, of devices for braking the respective wheels equally when the wheels are moving straight ahead, comprising means whereby the actions of said devices are automatically changed in turning so that less braking force is applied to both front wheels.

3. The combination with an axle having steering wheels pivoted thereto, of an operating shaft carried on the axle, brakes associated with said wheels and connection levers between the brakes and operating shaft, said levers on the wheel and axle being disposed with respect to said wheel pivots so that on actuation of said operating shaft on turning said wheels, the pressure on both brakes is relieved.

4. The combination with a pair of steering wheels on an axle of a vehicle, of devices for braking the respective wheels equally when the wheels are moving straight ahead, said devices being disposed so the actions thereof are automatically changed in turning so as to give less braking on the pair of steering wheels, and an operating shaft for said devices carried on said axle.

5. The combination with a pair of steering wheels pivotally mounted on an axle of a vehicle, of means for braking the respective wheels equally when the wheels are moving straight ahead, and for automatically decreasing the braking effect on both front wheels when turning, said means including brake shoes and a revoluble cam adapted to separate the shoes, an arm disposed on the shaft of said cam, a connecting rod being pivoted to said arm in various positions with respect to the wheel pivot axis, and a horizontal shaft supported by the axle, with means for rotating said shaft.

6. The combination with a pair of steering wheels, of brakes therefor, and means for applying the brakes including parts arranged to be operated by the swivelling of the wheels in steering to vary the braking on said wheels in the same sense.

7. The combination with a pair of steering wheels, of brakes therefor, and operating connections for the brakes including joints so arranged with respect to the steering axes that the pressure on both brakes is varied in the same sense by swivelling the wheels.

8. A vehicle steering wheel having a brake and mounted for swivelling movement about a substantially vertical axis, and operating mechanism for the brake including a connection so arranged with respect to said axis that swivelling the wheel in either direction varies the braking in the same sense.

9. A vehicle steering wheel having a brake and mounted for swivelling movement about a substantially vertical steering axis, and operating mechanism for the brake including a brake-operating part swivelling with the wheel and a second part connected to the brake-operating part at a point horizontally spaced from said steering axis in a plane substantially parallel to the wheel.

10. A vehicle steering wheel having a brake and mounted for swivelling movement about a substantially vertical steering axis, and operating mechanism for the brake including a brake-applying arm swivelling with the wheel, and a link connected to said arm at a point horizontally spaced from said steering axis in a plane substantially parallel to the wheel.

11. A vehicle having an axle with a knuckle swivelled at the end thereof, a wheel rotatably mounted on the knuckle, a brake for the wheel, and operating mechanism for the brake comprising, in combination with said parts, a brake-applying arm swivelling with the knuckle, an arm pivotally supported by the axle, and a link connecting said arms and pivoted to one of them at a point horizontally spaced from the steering axis in a plane substantially parallel to the wheel.

12. A vehicle having, in combination, road wheels, at least some of which are swivelled for steering the vehicle, brakes for said wheels, and means operated by swivelling the steering wheels for relieving the pressure on at least one brake without increasing the pressure on any other brake.

13. A vehicle having, in combination, two swivelled front wheels having brakes, and means operated by swivelling the wheels for relieving the pressure on one brake without increasing the pressure on the other brake.

14. In a steering wheel brake, the combination of a steering wheel and a steering knuckle, a brake drum carried by said wheel, a brake adapted to register with said drum, and actuating means mounted on said knuckle and adapted to apply said brake and arranged to first gradually release said brake in proportion to the turning movement of said wheel and to entirely release said brake at a predetermined angle of turn.

15. In a steering wheel brake, the combination of an axle, a steering wheel, a brake drum attached thereto, a split brake band adapted to register with said drum, means for moving said band, said means being carried on the steering knuckle, and operating mechanism for actuating said moving means, said mechanism being carried on the axle, and being adapted to be moved during the turning movement of the wheel to release the brake.

16. In a steering wheel brake, the combination of an axle, a steering knuckle, a steering wheel, a brake drum attached to said wheel, a brake for said drum, and brake-operating mechanism for engaging said brake with said drum, said operating mechanism comprising a member mounted on said steering knuckle, a member mounted on said axle and an intermediate member adapted to move during turning action of said wheels to release said brake in proportion to the turning action.

17. In a steering wheel brake, the combination of an axle, a steering knuckle, a steering wheel, a brake drum attached to said wheel, a brake for said drum, and brake-operating mechanism for engaging said brake with said drum, said operating mechanism comprising a rock shaft and arm carried by said steering knuckle and connected to the brake, an operating rock shaft and arm carried by said axle, and an intermediate connection pivotally connected to said two arms and adapted to move during turning movement of said wheel to gradually release said brake.

18. In multiple wheel brakes for automotive vehicles, the combination of a pair of steering wheels and non-steering wheels, brakes on all of said wheels, and brake-actuating mechanism adapted to apply said brakes equally, said steering wheel brake-actuating mechanism being adapted to gradually release such brakes during turning movement of said wheels.

In testimony whereof I have hereunto signed my name.

HENRI PERROT.